Figure 1:
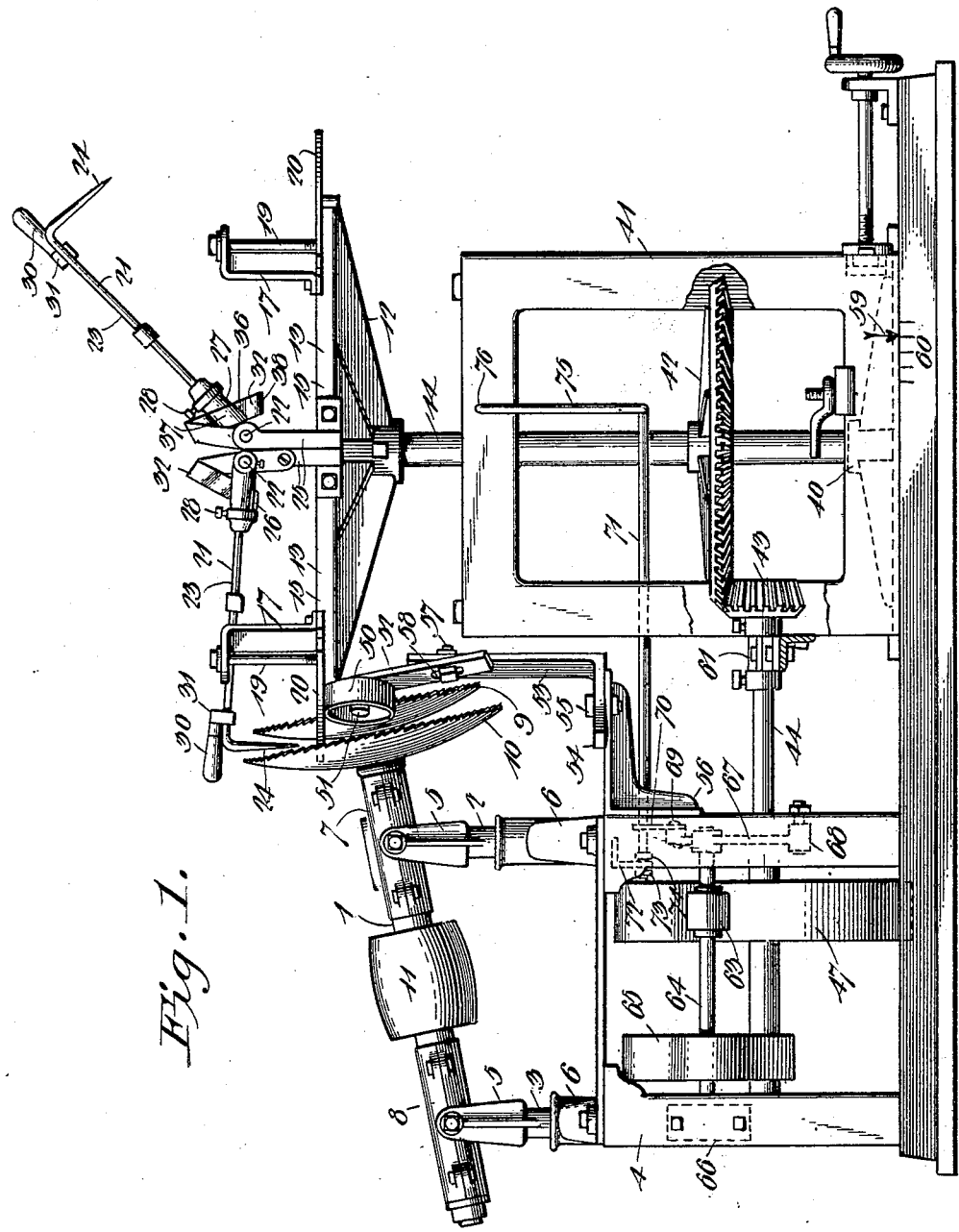

No. 689,305. Patented Dec. 17, 1901.
A. P. HARLAND.
FELLY SAWING MACHINE.
(Application filed May 22, 1901.)

(No Model.) 3 Sheets—Sheet 1.

Witnesses

Allen P. Harland, Inventor.
by C. A. Snow & Co.
Attorneys

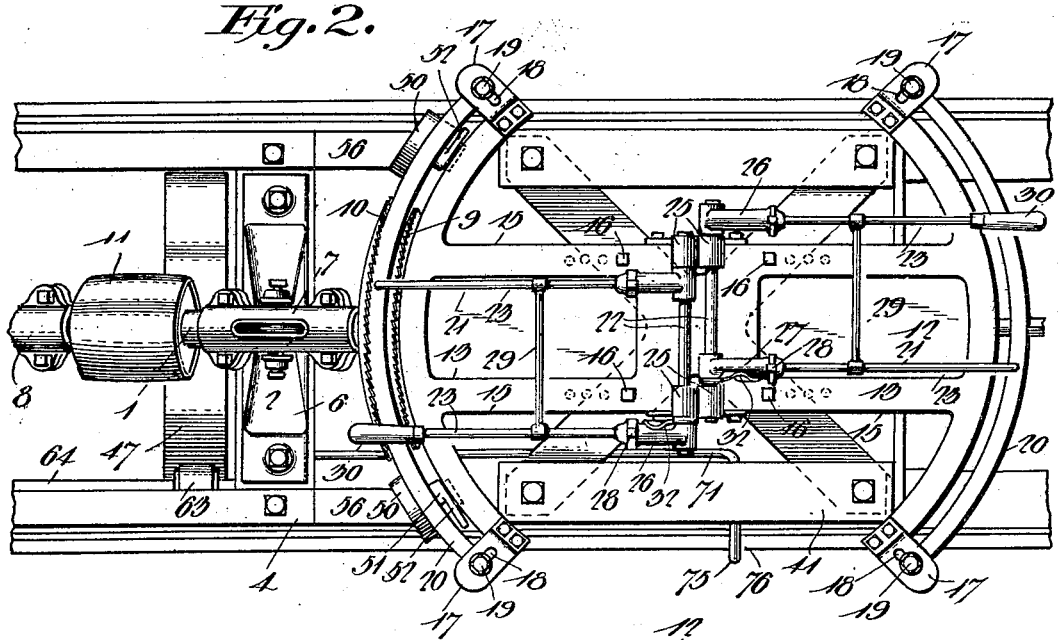

No. 689,305. Patented Dec. 17, 1901.
A. P. HARLAND.
FELLY SAWING MACHINE.
(Application filed May 22, 1901.)

(No Model.) 3 Sheets—Sheet 3.

Witnesses

Allen P. Harland, Inventor.
by C. A. Snow & Co.
Attorneys

UNITED STATES PATENT OFFICE.

ALLEN P. HARLAND, OF FLORENCE, ALABAMA.

FELLY-SAWING MACHINE.

SPECIFICATION forming part of Letters Patent No. 689,305, dated December 17, 1901.

Application filed May 22, 1901. Serial No. 61,432. (No model.)

*To all whom it may concern:*

Be it known that I, ALLEN P. HARLAND, a citizen of the United States, residing at Florence, in the county of Lauderdale and State of Alabama, have invented a new and useful Felly-Sawing Machine, of which the following is a specification.

The invention relates to improvements in felly-sawing machines.

The object of the present invention is to improve the construction of felly-sawing machines, more especially that shown and described in Patent No. 650,319, granted to me the 22d day of May, 1900, and to provide a machine of this character in which the rotary table which carries the work may be instantly stopped while the saws are in motion. In the machine shown and described in the said patent the vertical shaft upon which the rotary table is mounted is driven by frictional gear and the table which carries the work is supported by a roller to prevent it from vibrating during the operation of cutting, and it has been found by experience that it requires a nice adjustment to distribute the weight between the frictional gearing and the support for the table to prevent the latter from vibrating and at the same time secure a proper engagement of the frictional gearing.

The present invention therefore has for its object to provide positive gearing for communicating motion to the vertical shaft and to enable the rotary table to be firmly supported during the entire operation of sawing.

The invention also has for its object to provide at a point more or less remote from the vertical shaft frictional gearing for controlling the power for driving the rotary table and to enable the same to be driven at a uniform and predetermined power and to permit the speed of the rotary table to be automatically checked should the resistance to the same increase by reason of the material being hard or knotty or of an increased thickness, whereby the saws and the other parts of the machine will be subjected to a uniform strain and injury to the machine effectually prevented.

Another object of the invention is to improve the construction of the means for clamping the material to the rotary table and to provide a simple, inexpensive, and efficient clamping-dog which will firmly hold the material on the felly-supports and which may be readily engaged with the material and which will be entirely out of the way when not in engagement with the same to clear the table and facilitate the removal of the completed felly-sections and the arrangement of the material on the table.

A further object of the invention is to provide supporting rollers or wheels arranged to sustain the felly-supports of the rotary table during the entire sawing operation to prevent the table from vibrating and capable of ready adjustment to arrange them in proper position to conform to the adjustment of the table to suit the various circles in which the carriages may revolve.

The invention consists in the construction and novel combination and arrangement of parts hereinafter fully described, illustrated in the accompanying drawings, and pointed out in the claims hereto appended.

Figure 5:
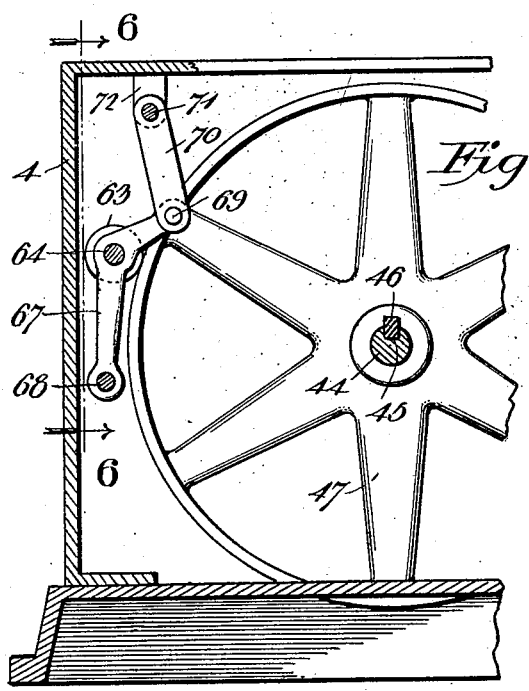
Figure 6:
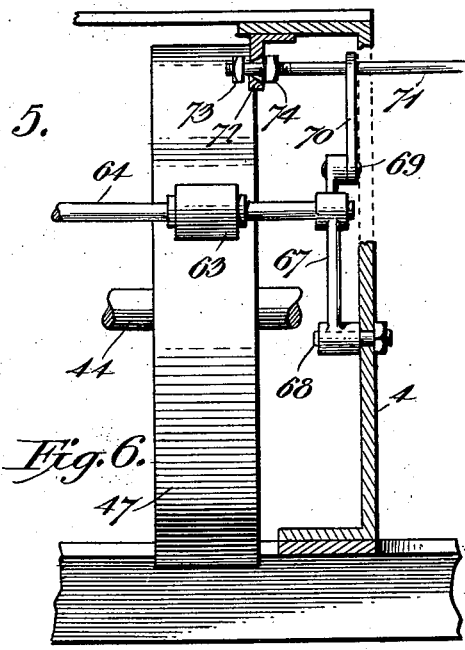
Figure 7:
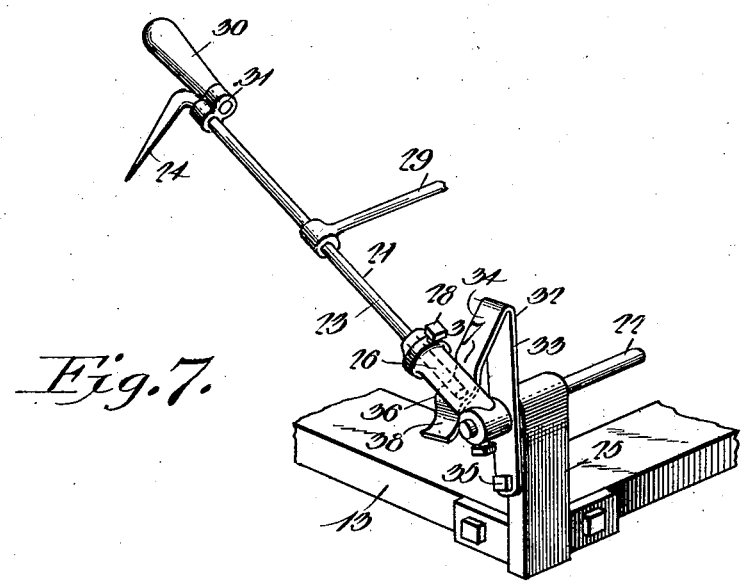

In the drawings, Figure 1 is a side elevation of a felly-sawing machine constructed in accordance with this invention. Fig. 2 is a plan view of the same. Fig. 3 is a longitudinal sectional view illustrating the arrangement of the gearing for driving the vertical shaft which carries the rotary table. Fig. 4 is a detail sectional view illustrating the manner of adjustably mounting the carriages or sections of the rotary table. Fig. 5 is an enlarged sectional view taken transversely of the main frame and illustrating the arrangement of the frictional gearing for driving the rotary table. Fig. 6 is a sectional view on the line 6 6 of Fig. 5. Fig. 7 is a detail perspective view illustrating the construction of the clamping-dogs and the spring for supporting and actuating the same.

Like numerals of reference designate corresponding parts in all the figures of the drawings.

1 designates an inclined saw-arbor adjustably mounted and supported by inner and outer shaft-hangers 2 and 3, constructed substantially the same as those shown and described in the said patent and mounted on a main frame 4. The said hangers or supports 2 and 3 are composed of upper and lower sections 5 and 6, the upper sections 5 being forked or bifurcated for the reception of journal-boxes 7 and 8, in which the saw-arbor is journaled. The journal-boxes are pivotally mounted in the forks or bifurcations of the upper sections of the hangers or supports, which are independently adjustable to change the inclination of the saw-arbor and arrange saws 9 and 10 in the desired position, so that their cuts or kerfs will be at right angles to the planes of the upper and lower faces of the material. The saw arbor or shaft has keyed or otherwise secured to it at a point between its ends a pulley 11, designed to receive a belt, by means of which the saws are driven, and the saws are driven entirely independent of the rotary table, hereinafter described, which is adapted to be stopped and started while the saws are in motion. The saws 9 and 10, which are of circular form, are concavo-convex to provide the proper curvature to correspond to the inner and outer faces of the felly-sections, and they are designed to be mounted adjustably on the saw-arbor, as explained in the said patent, to vary the distance between them and to enable them to be removed and replaced by other saws; but as this construction does not form a part of the present invention a detailed description and illustration are deemed unnecessary.

The material is fed to the saws by a rotary table composed of a main section or body portion 12 and a plurality of sections or carriages 13, which are adjustably mounted on the main section or body 12, and the latter forms a pair of oppositely-disposed arms, which extend from the upper end of a vertical shaft 14, as clearly illustrated in Fig. 3 of the accompanying drawings. The carriages or sections 13, which are adjustable radially or longitudinally of the main section or body portion 12, are composed of stems or radial portions and curved outer or circumferential portions, and the said stems, which are preferably provided with openings to lighten the structure, have side flanges 15 to receive the body portion 12 and are bolted to the same, as illustrated in Fig. 4 of the accompanying drawings. The flanges 15, which depend from the side edges of the stems or radial portions of the carriages, form ways for the main section or body portion 12, and the latter is provided with series of perforations arranged at intervals, as clearly illustrated in dotted lines in Fig. 2 of the accompanying drawings, to receive the bolts 16 and permit the carriages or sections to be secured at the desired adjustment. The circumferential portions of the carriages are provided at their ends with substantially L-shaped brackets 17, extending upward and outward from the table and provided in their upper horizontal portions with slots 18, receiving the upper ends of rods or stems 19 of curved felly-supports 20, which are constructed and arranged similar to those shown in the said patent. The curved felly-supports are arranged concentric with and spaced from the curved circumferential portions of the carriages and are adapted to pass through the intervening space between the saws. The upper ends of the rods or stems are adjustably secured to the horizontal portions of the L-shaped brackets, and by moving the felly-supports inward and outward they may be readily adjusted to correspond to the position of the circular saws.

The material is held on the rotary table by clamping devices or dogs 21, each composed of a transverse shaft or pintle 22 and a pair of rods or arms 23, adjustably connected with the shaft or pintle and adapted to swing upward and downward to carry engaging outer portions 24 into and out of engagement with the material. The transverse shaft is journaled in suitable bearings of posts or brackets 25, and they have sleeves or sockets 26 and 27 secured to them for the reception of the inner ends of the rods or arms. The brackets or posts 25 are provided at their lower ends with attachment plates or flanges and are bolted to the inner ends of the radial stems or portions of the carriages or sections 13, as clearly illustrated in Figs. 2 and 7 of the accompanying drawings. The sleeves or sockets 26 and 27 are provided at their inner ends with eyes or hubs for the transverse shaft or pintle, and they are suitably secured to the same, and the said sockets or sleeves are provided with clamping-screws 28, mounted in threaded perforations and engaging the inner ends of the rods or arms 23 and securing the same at the desired adjustment. The rods or arms, which are centrally connected by a transverse rod 29, are adapted to be moved inward and outward to lengthen and shorten the clamping device to correspond to the position of the felly-supports and to enable the material to be firmly clamped. The connecting transverse rod 29 is provided at its ends with eyes to receive the rods or arms; but it may be secured to them in any other suitable manner, and it coöperates with the sleeves or sockets in connecting the rods or arms and in causing the same to swing upward and downward together. The outer ends of the rods or arms are bent downward and pointed to form the engaging portions or spurs 24, which are partially embedded in the material. The engaging portions or spurs are located at opposite sides of the center of a felly-section when in engagement with the same, and they are capable of firmly holding the material on the felly-support and of effectually resisting any tendency of the same to twist, which result has been frequently found impossible when the material is clamped only at one end. A grip or handle 30 is secured to one of the arms or rods, and it extends beyond the same and is adapted to be readily grasped by the operator to swing the clamping device or dog upward and downward to disengage it from and engage it with the material. The handle or grip is provided at its inner end with a double ferrule 31, consisting of a pair of ferrules or sleeves united at their adjacent sides and receiving the inner end of the handle and the adjacent rod or arm, as clearly shown in Fig. 7 of the drawings. When the clamping device or dog is swung upward, as illustrated in Figs. 1 and 7 of the accompanying drawings, the table or that portion of it below the raised clamping device or dog is entirely clear, and the material may be readily placed on the table, and the completed felly-section may be conveniently removed therefrom.

The clamping device or dog is supported in an elevated position, as shown in Fig. 7, by means of a catch or spring 32, which is also adapted when the clamping device or dog is swung downward to actuate the same and force the engaging portions or spurs into the material. This spring or catch, which is constructed of heavy resilient material, consists of an upright portion 33 and an inclined portion 34, which extends downward and outward from the upper end of the upright portion and which has its outer portion arranged in the path of the adjacent sleeve or socket of the clamping device or dog. The upright portion 33 is perforated for the reception of the transverse shaft or pintle and is interposed between the hub of the sleeve or socket 26 and the post 25, and it is secured at its lower end to the latter by a screw 35 or other suitable fastening device, as clearly indicated in Fig. 7. The inclined portion 34 is deflected laterally to arrange it adjacent to the central portion of the sleeve or socket 26, and it is provided with a convex bend 36 and upper and lower concave bends 37 and 38, located above and below the outwardly-extending convex bend and forming seats for and conforming to the configuration of the sleeve or socket 26. When the clamping device or dog is elevated, as illustrated in Fig. 7 of the drawings, the sleeve or socket 26 is carried above the convex bend 36 and is held by the same in an elevated position, the sleeve or socket being received in the upper concave portion or bend 37. When the clamping device or dog is swung downward to engage it with the material, the sleeve or socket 26 is carried below the convex or outwardly-extending bend 36 and the inclined portion of the spring or catch is depressed and will operate to force the clamping-dog downward into engagement with the material as soon as the sleeve or socket passes the convex outwardly-extending bend 36. The lower portion or end of the inclined arm of the spring or catch extends beneath the sleeve or socket and is adapted to limit the downward swing of the same to prevent the sharp points of the engaging portions or spurs from coming in contact with the metal felly-supports and being dulled or blunted by such contact.

The vertical shaft 14 is journaled in upper and lower bearings 39 and 40 of a movable frame 41, which is constructed substantially the same as that shown and described in the said patent. The lower bearing 40, in which the lower end of the vertical shaft 14 is stepped, is preferably arranged on the bottom of the adjustable frame, which bottom is rigidly secured to the sides. The top of the frame is connected in a similar manner to the sides, and the vertical shaft 14 is not vertically adjustable, as explained in the said patent.

The vertical shaft 14 has keyed or otherwise secured to it a horizontal gear-wheel 42, provided at its lower face with spur-teeth arranged at an inclination and meshing with a bevel-pinion 43, which is fixed to a horizontal shaft 44, provided with a longitudinal groove 45 and slidingly mounted in suitable bearings of the main frame, as clearly illustrated in Fig. 3 of the accompanying drawings. The longitudinal groove 45 receives a key or feather 46 of a pulley 47, mounted on the longitudinal shaft 44 and spaced from the ends of the main frame by sleeves 48 and 49, which prevent the pulley 47 from changing its position when the shaft 44 is moved longitudinally. The spur-gearing, which connects the vertical and horizontal shafts 14 and 44, forms positive means for communicating motion from the horizontal shaft to the vertical shaft, and it enables a pair of supporting rollers or wheels 50 to be arranged at opposite sides of the saws for sustaining the felly-supports to prevent the table from being vibrated by the saws during the operation of sawing. By employing spur-gearing the entire weight of the table at the saws may be supported by the rollers or wheels 50 without interfering with the operation of the gearing for communicating motion from the horizontal shaft 44 to the vertical shaft 14, and it is therefore unnecessary to provide the nice distribution of the weight between such wheels and the gearing, as is necessary with the construction shown in the said patent, in order to insure a proper support for the table and a proper operation of the gearing. The rollers or wheels are mounted upon suitable spindles or axles 51, which are carried by adjustable bars or supports 52, and the latter are mounted on approximately L-shaped bars 53. The L-shaped bars 53 have their horizontal arms 54 pivoted by vertical bolts or pivots 55 to brackets 56, and the upper bars 52 are adjustably and pivotally connected with the vertical portions of the L-shaped lower bars by horizontal bolts or pivots 57, passing through perforations of the lower bars and through slots 58 of the upper bars. The brackets 56 are bolted or otherwise secured to the inner end of the main frame at opposite sides thereof, as clearly shown in Figs. 1 and 2 of the drawings, and the lower bars 53 are adapted to swing horizontally. The upper bars are capable of being raised and lowered to provide the proper support for the felly-supports, and they are also capable of being swung inward and outward. By these adjustments the rollers or wheels are adapted to be properly set for supporting the table at any adjustment of the same, and when so set the rollers or wheels will rotate frictionlessly and not bind against the felly-supports or the shafts or spindles 51.

The main frame is provided with a base or bed plate which supports the adjustable frame 41, and the adjustment thereof is effected in the same manner as shown and described in the said patent, and the same means are employed for clamping the frame 41 in its adjusted position. The frame 41 is provided at its bottom with a pointer or indicator 59, and the base or bed plate of the main frame is provided with a suitable scale 60, arranged adjacent to the pointer and adapted to enable the machine to be accurately set by any one for sawing in circles of different diameters.

When the movable frame is adjusted longitudinally of the main frame, it carries with it the horizontal shaft 44, which slides longitudinally and which is journaled in a suitable bearing 61 of the adjustable frame. The pulley 47, which is held against longitudinal movement by the sleeves 45 and 46 when the horizontal shaft 44 slides, consists of a friction-wheel and is engaged at its periphery by a small friction-wheel or pinion 63, mounted on a horizontal shaft 64, which also carries a pulley 65, adapted to receive a belt which is independent of the belt which drives the pulley 11 of the saw-arbor. The outer end of the shaft 64 is journaled in a suitable bearing 66 at the outer end of the main frame, and the inner end of the said shaft 64 is journaled in a suitable bearing of a lower link or lever 67, of bell-crank form, pivoted at its lower end 68 and connected at its upper end by a pivot 69 to the lower end of an upper link 70. The upper end of the link 70 is secured to a longitudinal rod 71, which is fulcrumed at its inner end on a suitable hanger 72. The shaft 64 is journaled on the lower link or lever 67, at the angle thereof, and the upper arm of the said link or lever 70 extends inward beyond the periphery of the friction-wheel 47, as clearly illustrated in Fig. 5 of the accompanying drawings, whereby when the operating-rod 71 is slightly raised, as hereinafter explained, the small friction-wheel 63 will be lifted out of engagement with the large friction-wheel 47, and the rotary table will be instantly stopped without interfering with the rotation of the saws. The hanger 72 is provided with a tapering opening to permit the operating-rod to be swung upward and downward, and the inner end of the operating-rod 71 is threaded for the reception of nuts 73 and 74, located at opposite sides of the depending portion of the hanger 72, which is secured to the main frame. The outer end of the operating-rod is provided with an upwardly-extending arm or portion 75, terminating in a hook or projection 76, adapted to be engaged over the top of the adjustable frame to hold the small friction-wheel out of engagement with the large friction-wheel. It will be apparent that the operating-rod may be readily lifted and that when raised it will swing the small friction-wheel upward away from the large friction-wheel and instantly stop the rotation of the table. The weight of the operating-rod holds the small friction-wheel in engagement with the large friction-wheel, and it may be made of any avoirdupois to secure the desired power for driving the rotary table. By this construction a uniform power and speed is obtained when the conditions are normal; but should the resistance to the feed or rotation of the table increase, by reason of the material being hard or knotty or of an increased thickness, the frictional gearing, while maintaining a uniform power, will permit the forward movement or feed of the rotary table to be checked to preserve a uniform strain on the saws and the other portions of the machine, and thereby prevent the machine from being broken or otherwise injured should the rotary frame or table which carries the material encounter a sudden or high resistance. As soon as the resistance becomes normal the normal feed of the carriages will be resumed.

It will be seen that the gearing for driving the rotary table is entirely separate and distinct from the means for rotating the saw-arbor, that the table may be instantly stopped while the saws are in motion, and that the force for driving and feeding the carriages remains constant and uniform irrespective of the resistance encountered, whereby injury to the machine is effectually prevented. Also the carriages are supported during the entire sawing operation, and when the felly-support leaves one of the rollers or wheels 50 it will be sustained by the other roller or wheel and will not be vibrated. The vibration of the table is thus prevented, and the feed of the carriages is automatically adapted to the cutting capacity of the saws at each instant of cut, and the supporting rollers or wheels are capable of ready adjustment to position them properly with relation to the carriages. The dogs or clamping devices engage the work near both ends and firmly hold the same in position, and they are actuated by the springs, both in engaging the work and when being swung upward therefrom. The springs also engage the dogs or clamping devices when the latter are in engagement with the work, and they prevent the said dogs or clamping devices from being accidentally moved from one position to the other.

What I claim is—

1. The combination of a rotary table provided with radially-adjustable carriages and having felly-supports spaced from the carriages, a saw, and the supporting wheels or rollers mounted at opposite sides of the saw and arranged to support the rotary table during the entire sawing operation, said wheels or rollers being adjustably mounted and adapted to be arranged to correspond to the adjustment of the carriages, substantially as described.

2. In a machine of the class described, the combination of a rotary table, a saw, the lower pivotally-mounted supporting-bar arranged to swing horizontally, the upper supporting-bar pivoted to the lower supporting-bar and adapted to swing inward and outward, and a roller or wheel mounted on the upper supporting-bar and arranged to support the table, substantially as described.

3. In a machine of the class described, the combination of a rotary table, a saw, the lower L-shaped supporting-bar having a vertical pivot and arranged to swing horizontally, the upper supporting-bar, the horizontal fastening device passing through the supporting-bars and pivoting the upper supporting-bar, one of the supporting-bars being provided with a slot, and a roller or wheel mounted on the upper supporting-bar and arranged to support the table, substantially as described.

4. In a machine of the class described, the combination of a rotary table provided with radially-adjustable carriages and having felly-supports spaced from the carriages, the saws spaced apart to receive the felly-supports, the upper and lower adjustable supporting-bars mounted at opposite sides of the saws, and the rollers or wheels mounted on the upper bars, and arranged to receive the felly-supports, substantially as described.

5. In a machine of the class described, the combination of a vertical shaft, a rotary table carried by the vertical shaft, the supporting rollers or wheels arranged to support the table during the entire sawing operation, a saw, a horizontal shaft, spur-gearing connecting the said shafts, and frictional gearing for driving the horizontal shaft, substantially as described.

6. In a machine of the class described, the combination of a vertical shaft, a table carried by the same, a horizontal shaft, spur-gearing connecting the said shafts, a friction-wheel 47 mounted on the horizontal shaft, a small friction-wheel engaging the friction-wheel 47, and operating mechanism connected with the small friction-wheel and holding the same in engagement with the said wheel 47, substantially as described.

7. In a machine of the class described, the combination of a vertical shaft, a table carried by the same, a horizontal shaft, gearing connecting the shafts, a friction-wheel 47 mounted on the horizontal shaft, a small friction-wheel engaging the wheel 47, a saw driven independently of the table, and operating mechanism connected with the small friction-wheel and adapted to move the same out of engagement with the wheel 47, whereby the table may be stopped without stopping the saw, substantially as described.

8. In a machine of the class described, the combination of a vertical shaft, a table carried by the same, a horizontal shaft, gearing connecting the said shafts, a large friction-wheel mounted on the horizontal shaft, a small friction-wheel engaging the large friction-wheel, an oscillating link or lever connected with the small friction-wheel, and operating mechanism for oscillating the said link or lever, substantially as described.

9. In a machine of the class described, the combination of a rotary table, a large friction-wheel, gearing connecting the large friction-wheel with the rotary table, the bell-crank lever or link arranged adjacent to the large friction-wheel, a small friction-wheel connected with and carried by the link or lever and adapted to engage the large friction-wheel, and operating mechanism connected with the bell-crank lever or link, substantially as described.

10. In a machine of the class described, the combination of a rotary table, a vertical shaft, a horizontal shaft, gearing connecting the shafts, a large friction-wheel mounted on the horizontal shaft, a bell-crank lever or link, an operating-rod fulcrumed at one end and adapted to be oscillated and connected with the lever or link, and a friction-wheel carried by the bell-crank lever or link and arranged to engage the large friction-wheel, substantially as described.

11. In a machine of the class described, the combination of a vertical shaft, a rotary table carried by the shaft, a horizontal shaft, gearing connecting the said shafts, a large friction-wheel mounted on the horizontal shaft, the shaft 64 capable of a limited oscillation and fulcrumed at one end, a bell-crank link or lever supporting the other end of the shaft 64, a small friction-wheel mounted on the shaft 64 and arranged to engage the large friction-wheel, and operating mechanism connected with the link or lever, substantially as described.

12. In a machine of the class described, the combination with the main and movable frames, and a saw, of a vertical shaft mounted on the movable frame, a horizontal shaft, gearing connecting the shafts, a large friction-wheel mounted on the horizontal shaft, the shaft 64, capable of a limited oscillation, the bell-crank lever connected with the shaft 64, the longitudinal operating-rod fulcrumed at one end and provided at its other end with means for engaging one of the frames, a link connecting the rod with the lever, and a friction-wheel carried by the shaft 64 and engaging the large friction-wheel, substantially as described.

13. In a machine of the class described, the combination of a rotary table, a dog or clamping device hinged to the table and adapted to swing upward and downward, and a resilient catch engaging the dog or clamping device and adapted to support the same in an elevated position and hold it in engagement with the work, substantially as described.

14. In a machine of the class described, the combination of a rotary table, a dog or clamping device hinged to the table and adapted to swing upward and downward, and a resilient catch having an arm or portion arranged in the path of the dog or clamping device and adapted to support the same in its raised and lowered positions and provided with a projecting portion arranged to engage and actuate the dog or clamp when the same is swung upward and downward, substantially as described.

15. In a machine of the class described, the combination of a rotary frame or table, a dog or clamping device hinged to the table and adapted to swing upward and downward, and the catch or spring having an inclined arm arranged in the path of the dog or clamping device and provided with a projecting convex bend and having upper and lower concave bends located above and below the convex bend, substantially as and for the purpose described.

16. In a machine of the class described, the combination of a rotary table, and a dog or clamping device arranged to swing upward and downward and provided with the arms or rods connected together and provided at their outer ends with depending engaging portions, substantially as described.

17. In a machine of the class described, the combination of a rotary table, a clamping dog or device arranged to swing upward and downward and comprising a shaft or pintle, sockets or sleeves mounted on the shaft, and the rods or arms adjustably secured in the sockets or sleeves and provided at their outer ends with engaging portions, substantially as described.

18. In a machine of the class described, the combination of a rotary table, and a clamping-dog comprising a shaft or pintle, sleeves or sockets secured to the same, the rods or arms adjustably mounted in the sleeves or sockets, a transverse rod connecting the said rods or arms, and a handle secured to one of the rods or arms, substantially as described.

19. In a machine of the class described, the combination of a rotary table provided with adjustable carriages, posts or brackets mounted on the carriages and provided with bearings, felly-supports adjustably connected with the carriages, the adjustable clamping-dogs having pintles arranged in the said bearings and adapted to swing upward and downward, and springs or catches for engaging the clamping-dogs, substantially as described.

In testimony that I claim the foregoing as my own I have hereto affixed my signature in the presence of two witnesses.

ALLEN P. HARLAND.

Witnesses:
E. E. DOYLE,
FRANK S. APPLEMAN.